(12) United States Patent
Pampel

(10) Patent No.: US 10,167,975 B2
(45) Date of Patent: Jan. 1, 2019

(54) COUPLING SYSTEM FOR AN EXPANDABLE FLUID DISTRIBUTION SYSTEM

(75) Inventor: Jan Pampel, Vlotho (DE)

(73) Assignee: Norgren GmbH, Alpen (DE)

( * ) Notice: Subject to any disclaimer, the term of this patent is extended or adjusted under 35 U.S.C. 154(b) by 1950 days.

(21) Appl. No.: 13/531,777

(22) Filed: Jun. 25, 2012

(65) Prior Publication Data

US 2013/0341913 A1 Dec. 26, 2013

(51) Int. Cl.
*F16K 31/06* (2006.01)
*F16L 37/26* (2006.01)
*F16K 27/02* (2006.01)

(52) U.S. Cl.
CPC ........ *F16K 31/0655* (2013.01); *F16K 27/029* (2013.01); *F16L 37/26* (2013.01); *Y10T 29/49826* (2015.01); *Y10T 29/49876* (2015.01)

(58) Field of Classification Search
CPC ..... F16K 31/0655; F16K 27/029; F16L 37/26
USPC ................................................. 285/188, 325
See application file for complete search history.

(56) References Cited

U.S. PATENT DOCUMENTS

| | | | | |
|---|---|---|---|---|
| 2,958,547 A * | 11/1960 | Batts et al. | ...................... | 285/26 |
| 3,506,029 A * | 4/1970 | Demler, Sr. et al. | ..... | 137/561 R |
| 3,934,605 A * | 1/1976 | Legris | ........................... | 137/271 |
| 6,374,859 B1 * | 4/2002 | Vu et al. | ........................ | 137/884 |
| 7,261,122 B2 * | 8/2007 | Bordonaro et al. | ........... | 137/269 |
| 8,162,356 B2 * | 4/2012 | Rieger | ........................... | 285/325 |
| 8,342,474 B2 * | 1/2013 | Gilbreath | ........................ | 248/558 |
| 8,534,498 B2 * | 9/2013 | Campbell et al. | .................. | 222/1 |
| 8,985,153 B2 * | 3/2015 | Didier et al. | ................. | 137/884 |

* cited by examiner

*Primary Examiner* — James M Hewitt, II
(74) *Attorney, Agent, or Firm* — The Ollila Law Group LLC

(57) ABSTRACT

A coupling system for a fluid module (100) of an expandable fluid distribution system is provided. The coupling system includes a first coupling side (104) of the fluid module (100) with a female coupling part comprising an aperture (105) and a shoulder (108) and a male coupling part comprising a coupling tab (106) extending from the base (101). The coupling system also includes a second coupling side (204) of the fluid module (100) with a female coupling part comprising a slot (206) sized and shaped to receive at least a portion of the coupling tab (106) of an adjoining fluid module and a male coupling part comprising a fluid stem (205) and an engagement rim (208) sized and shaped to engage the shoulder (108) of an adjoining fluid module.

11 Claims, 6 Drawing Sheets

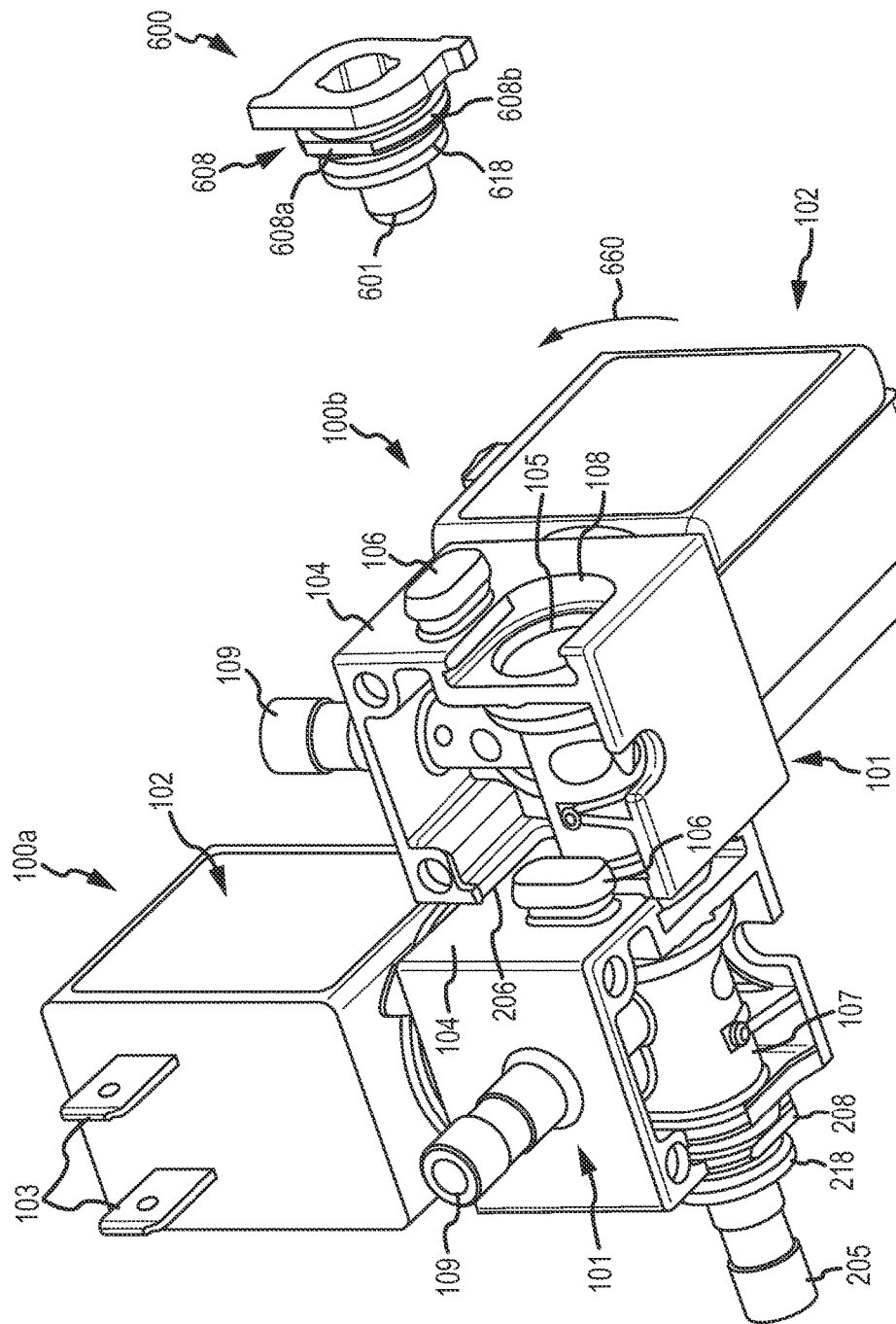

COUPLING SYSTEM FOR AN EXPANDABLE FLUID DISTRIBUTION SYSTEM

TECHNICAL FIELD

The embodiments described below relate to, fluid distribution systems, and more particularly, to a coupling system for an expandable fluid distribution system.

BACKGROUND OF THE INVENTION

Fluid distribution systems are utilized in a variety of industries. Fluid distribution systems can comprise numerous modules such as valves, pressure regulators, pumps, throttles, etc. The fluid flowing through the fluid distribution system may comprise a gas, a liquid, or a combination thereof. In some systems, solids may be suspended within the gas or liquid. Therefore, in the present application, "fluid" can comprise any of the above-mentioned variations. In some fluid distribution systems, a common fluid supply may be used for multiple end purposes. As a result, multiple fluid modules, such as valves, pumps, pressure regulators, etc. are often incorporated to control the fluid flow from the fluid supply to an end use. Typically, the fluid modules are all coupled to a common valve manifold. This configuration however, results in excess space required to accommodate the size of the manifold.

Although systems exists where the various fluid modules of the fluid distribution system can be coupled together without a manifold, the systems often result in additional fluid lines expanding off from the main line in the form of a T-fitting. This can result in additional potential leak points. Further, in some situations, there may not be room for a T-fitting. Rather, some configurations require that all of the components within the fluid distribution system be in series in a single line.

Therefore, there is a need in the art for an expandable fluid distribution system that can be coupled in series. There is a need in the art for an expandable fluid distribution system that can be coupled in series without requiring extra coupling components between the fluid modules. The embodiments described below overcome these and other problems and an advance in the art is made.

The embodiments described below provide an expandable fluid distribution system wherein each fluid module of the fluid distribution system comprises at least two coupling sides. Each coupling side includes a male coupling part and a female coupling part. On a first coupling side, the male coupling part comprises a coupling tab. The coupling tab does not form part of the fluid pathway. The female coupling part on the first coupling side comprises an aperture with a shoulder configured to mate with an engagement rim of the corresponding male coupling part. On the second coupling side, the male coupling part comprises a fluid stem extending from the generally cylindrical engagement rim. The cylindrical engagement rim can include one or more cutout regions. The engagement rim can engage the shoulder formed on the female coupling part on a corresponding first coupling side. The female coupling part on the second coupling side comprises a slot sized and positioned to receive a coupling tab.

SUMMARY OF THE INVENTION

A coupling system for a fluid module of an expandable fluid distribution system is provided according to an embodiment. According to an embodiment, the coupling system comprises a first coupling side of the fluid module including a female coupling part comprising an aperture and a shoulder and a male coupling part comprising a coupling tab extending from the first coupling side. According to an embodiment, the coupling system further comprises a second coupling side of the fluid module including a female coupling part comprising a slot sized and shaped to receive at least a portion of the coupling tab of an adjoining fluid module. The second coupling side further includes a male coupling part comprising a fluid stem and an engagement rim sized and shaped to engage the shoulder of an adjoining fluid module.

A method for coupling two fluid modules is provided according to an embodiment. The method comprises a step of engaging a female coupling part formed on a first coupling side of a first fluid module with a male coupling part formed on a second coupling side of a second fluid module. The method further comprises a step of engaging a male coupling part formed on the first coupling side of the first fluid module with a female coupling part formed on the second coupling side of the second fluid module.

ASPECTS

According to an aspect, a coupling system for a fluid module of an expandable fluid distribution system comprises:
  a first coupling side of the fluid module including:
    a female coupling part comprising an aperture and a shoulder;
    a male coupling part comprising a coupling tab extending from the first coupling side;
  a second coupling side of the fluid module including:
    a female coupling part comprising a slot sized and shaped to receive at least a portion of the coupling tab of an adjoining fluid module; and
    a male coupling part comprising a fluid stem and an engagement rim sized and shaped to engage the shoulder of an adjoining fluid module.

Preferably, the coupling system further comprises a fluid passageway extending from the first coupling side to the second coupling side and in fluid communication with the aperture and the fluid stem.

Preferably, the shoulder comprises one or more straight portions and one or more curved portions.

Preferably, the engagement rim comprises a generally cylindrical shape with one or more cutout regions and one or more curved regions.

Preferably, the shoulder comprises two straight portions, which are separated by a distance $d_1$ and wherein the curved regions comprise a diameter $d_2$, which is greater than the distance $d_1$.

Preferably, the engagement rim comprises two cutout regions separated by a distance $d_3$, which is less than the distance $d_1$.

Preferably, the slot is sized and shaped to receive the coupling tab in a snap-fit arrangement.

Preferably, the coupling system further comprises a sealing member positioned around a portion of the fluid stem.

Preferably, the coupling system further comprises an end cap comprising a plug sized and shaped to engage the aperture and an engagement rim sized and shaped to engage the shoulder.

Preferably, one or more of the shoulder, the engagement rim, the coupling tab, or the slot comprise a ramped surface resulting in a change in thickness.

According to another aspect, a method for coupling two fluid modules comprises steps of:
  engaging a female coupling part formed on a first coupling side of a first fluid module with a male coupling part formed on a second coupling side of a second fluid module; and
  engaging a male coupling part formed on the first coupling side of the first fluid module with a female coupling part formed on the second coupling side of the second fluid module.

Preferably, the female coupling part formed on the first coupling side of the first fluid module comprises an aperture and a shoulder and wherein the male coupling part formed on the second coupling side of the second fluid module comprises a fluid stem and an engagement rim.

Preferably, the step of engaging the female coupling part formed on the first coupling side of the first fluid module comprises steps of:
  inserting the fluid stem into the aperture;
  positioning the engagement rim proximate the shoulder; and
  rotating one of the first or the second fluid modules with respect to the other to engage the engagement rim with the shoulder.

Preferably, the shoulder comprises one or more straight portions and one or more curved portions and the engagement rim comprises one or more cutout regions and one more curved regions and the step of rotating aligns the one or more curved regions of the engagement rim with the one or more straight portions of the shoulder.

Preferably, at least one of the shoulder or the engagement rim comprises a ramped surface such that the step or rotating draws the two fluid modules closer together.

Preferably, the male coupling part on the first coupling side of the first fluid module comprises a coupling tab and the female coupling part on the second coupling side of the second fluid module comprises slot sized and shaped to receive at least a portion of the coupling tab.

Preferably, the step of engaging the male coupling part on the first coupling side of the first fluid module comprises steps of:
  positioning the coupling tab proximate the slot; and
  rotating one of the first or the second fluid modules with respect to the other to slide at least a portion of the coupling tab into the slot.

Preferably, the step of rotating comprises engaging the coupling tab and the slot in a snap-fit engagement.

Preferably, at least one of the coupling tab or the slot comprises a ramped surface such that the step of rotating draws the two fluid modules closer together.

Preferably, the female coupling part on the first coupling side of the first fluid module and the male coupling part on the second coupling side of the second fluid module are in fluid communication with a fluid passageway extending through at least a portion of each fluid module.

Preferably, the method further comprises a step of engaging an end cap with a female coupling part formed in a first coupling side of the second fluid module.

BRIEF DESCRIPTION OF THE DRAWINGS

FIG. 6 shows the fluid distribution system with two fluid modules being coupled according to an embodiment.

DETAILED DESCRIPTION OF THE INVENTION

FIGS. 1-6 and the following description depict specific examples to teach those skilled in the art how to make and use the best mode of embodiments of a fluid distribution system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the fluid distribution system. As a result, the embodiments described below are not limited to the specific examples described below, but only by the claims and their equivalents.

Figure 1:
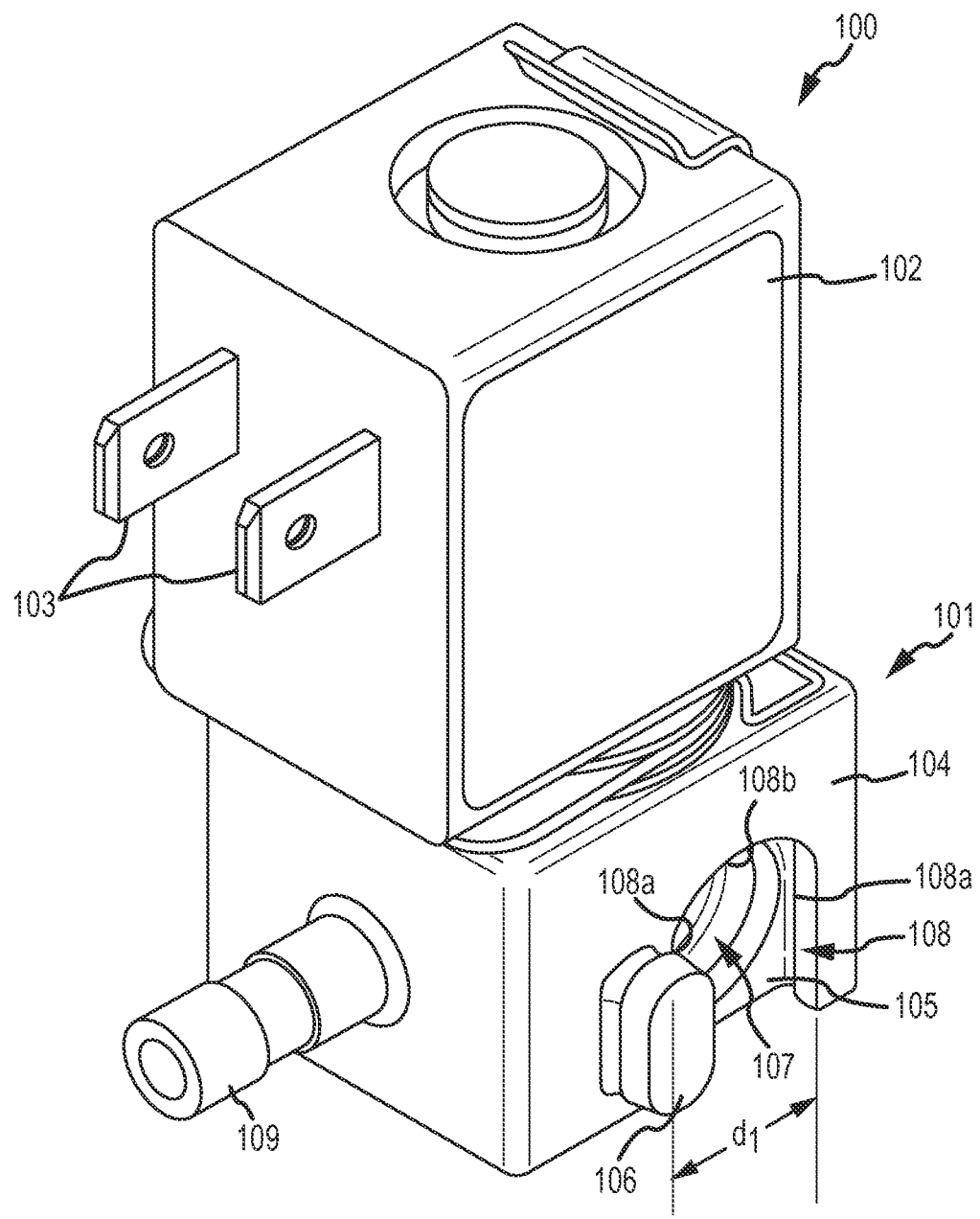
FIG. 1 shows a fluid module according to an embodiment.

FIG. 1 shows part of a fluid module 100 of an expandable fluid distribution system. The fluid module 100 comprises a solenoid valve; however, other types of fluid modules may be included in the expandable fluid distribution system. For example, those skilled in the art will readily recognize that the module 100 may comprise a pump, a throttle, a pressure gauge, etc. Consequently, while specific components of the solenoid valve are discussed below, these components are not required for the coupling system and are merely provided to illustrate one exemplary fluid module 100.

According to an embodiment, the fluid module 100 comprises a base 101 and an electromagnetic switch portion 102. The electromagnetic switch portion 102 can comprise a plug 103 for providing electrical energy to the solenoid (See FIG. 5). According to the embodiment shown, the fluid module 100 comprises a coupling system with a first coupling side 104 and a second coupling side 204 (See FIG. 2). According to an embodiment, the first coupling side 104 comprises a female coupling part and a male coupling part. According to an embodiment, the female coupling part is in fluid communication with a fluid passageway 107. The female coupling part comprises an aperture 105 and a shoulder 108. The aperture 105 can be sized and shaped to receive a corresponding male coupling part formed on a second coupling side of an adjacent fluid module as will be described in more detail below. According to an embodiment, the shoulder 108 surrounds at least a portion of the aperture 105. According to the embodiment shown, the shoulder 108 is only three sided with a fourth side open. In other words, the shoulder 108 extends to the end of the base 101 in FIG. 1. In other embodiments, the shoulder 108 can be closed and may not extend all the way to the bottom of the base 101.

According to an embodiment, the male coupling part of the first coupling side 104 comprises a projecting coupling tab 106. The coupling tab 106 can extend away from the base 101 and may be formed next to the female coupling part. However, the coupling tab 106 does not have to be formed next to the female coupling part and in other embodiments the coupling tab 106 may be formed at other locations on the first coupling side 104. According to an embodiment, the coupling tab 106 is not in fluid communication with the fluid passageway 107. In other words, no fluid flows through the coupling tab 106. According to the embodiment shown, the coupling tab 106 comprises an oval shaped projection. However, other shapes are certainly possible and the particular shape of the coupling tab 106 should in no way limit the scope of the present embodiment.

Also visible in FIG. 1 is a fluid outlet port 109. The fluid outlet port 109 can be selectively brought into fluid communication with the fluid passageway 107 based on the energy state of the electromagnetic switch portion 102, for example.

Figure 2:
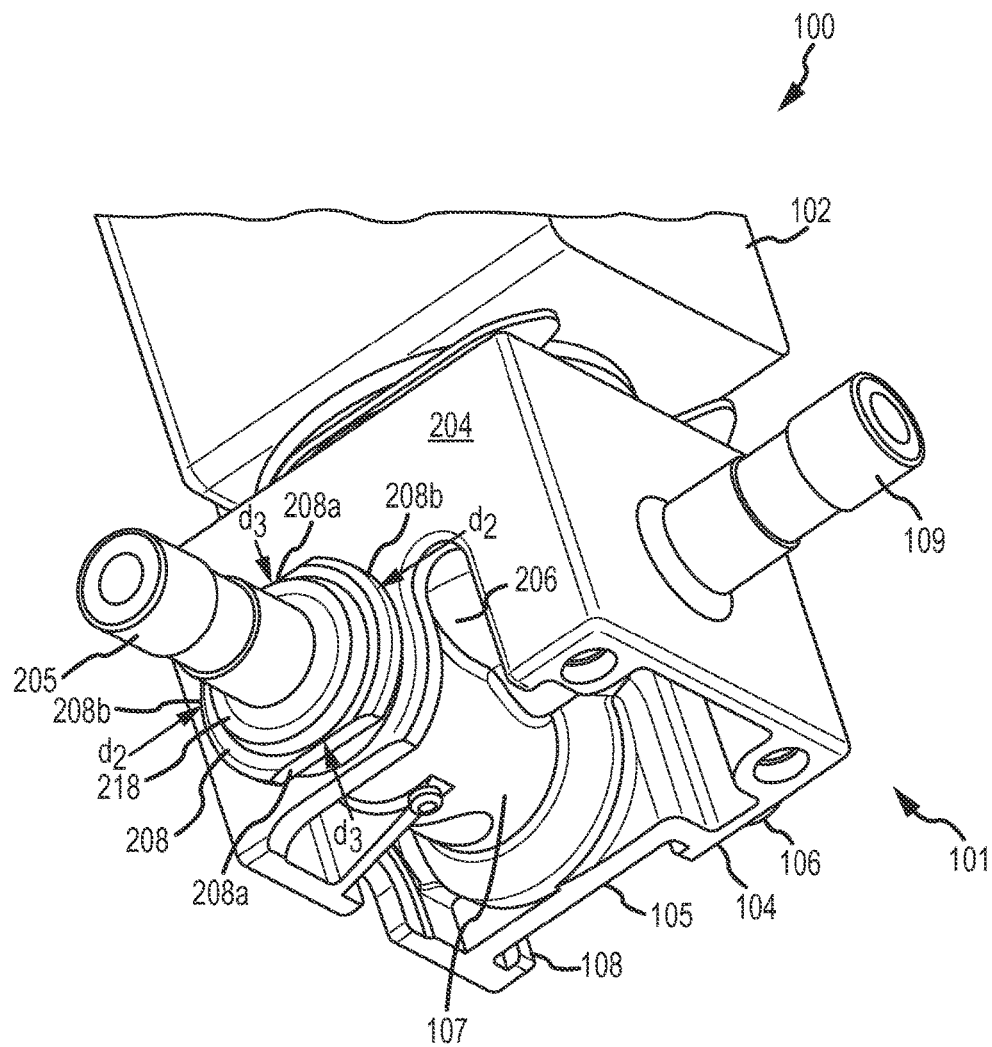
FIG. 2 shows a bottom perspective view of the fluid module according to an embodiment.

FIG. 2 shows a bottom perspective view of the fluid module 100 according to an embodiment. Now visible in FIG. 2 is the second coupling side 204 of the fluid module 100. According to the embodiment shown, the second coupling side 204 is opposite the first coupling side 104. However, in other embodiments, the second coupling side 204 may be on an adjacent side of the base 101 with respect to the first coupling side 104. In such an embodiment, the fluid passageway 107 may make a right angle within the base 101 rather than extending straight through the base 101.

According to an embodiment, the second coupling side 204 includes a male coupling part, which comprises a fluid stem 205 and an engagement rim 208. The engagement rim 208 surrounds at least a portion of an outer radial surface of the fluid stem 205 close to where the fluid stem 208 extends from the second coupling side 204. According to an embodiment, the engagement rim 208 extends radially away from the fluid stem 205. According to an embodiment, the fluid stem 205 can be sized and shaped to be received within the female coupling part 105 and the engagement rim 208 can engage the shoulder 108. As shown in more detail in the figures that follow, the engagement between the engagement rim 208 and the shoulder 108 can compress a sealing member 218 to form a substantially fluid-tight seal between two adjoining fluid modules 100. The sealing member 218 may be coupled to the fluid stem 205, the engagement rim 208, or both. Alternatively, the sealing member 218 may simply slide around the fluid stem 205 and abut the engagement rim 208. In some embodiments, the sealing member 218 may comprise an O-ring. However, other types of sealing members may be used without departing from the scope of the present embodiment. According to an embodiment, the sealing member 218 can provide a fluid-tight coupling for the fluid passageway 107, for example.

According to an embodiment, the engagement rim 208 comprises a generally cylindrical shape with one or more cutout regions 208a. The one or more cutout regions 208a allow the engagement rim 208 to engage the shoulder 108 of a corresponding female coupling part of an adjoining first coupling side 104. Referring briefly to FIG. 1, the shoulder 108 comprises two substantially straight portions 108a, which are joined by a curved portion 108b. The straight portions 108a are separated by a distance $d_1$. The distance $d_1$ is less than a distance $d_2$, which comprises the diameter of the curved regions 208b of the engagement rim 208. As can be appreciated, the engagement rim 208 can be received by the shoulder 108 if the cutout regions 208a are aligned with the straight portions 108a of the shoulder 108. This is because the cutout regions 208a extend a distance $d_3$, which is less than $d_2$. Upon rotating one fluid module 100 with respect to the other, the curved regions 208b of the engagement rim 208 can be aligned with the straight portions 108a of the shoulder 108 to prevent disengagement of the two adjoining fluid modules 100.

According to an embodiment, the second coupling side 204 also comprises a female coupling part. The female coupling part shown in FIG. 2 comprises a slot 206. The slot 206 can be sized and shaped to receive at least a portion of the coupling tab 106 extending from a first coupling side 104 of an adjoining fluid module 100. In some embodiments, the slot 206 is sized and shaped such that it can receive a portion of the coupling tab 106 in a snap-fit arrangement. In such embodiments, once at least a portion of the coupling tab 106 is received within the slot 206, a threshold pressure is required to disengage the coupling tab 106 from the slot 206. As can be appreciated, the slot 206 is opened at the bottom to allow the coupling tab 106 to enter from the bottom. When the coupling tab 106 engages the slot 206, the walls of the slot 206 are caught between the end of the coupling tab 106 and the wall of the first coupling side 104. The engagement between the coupling tab 106 and the slot 206 can limit the rotation of two adjoining fluid modules. In other words, the engagement can create a positive stop.

Figure 3:
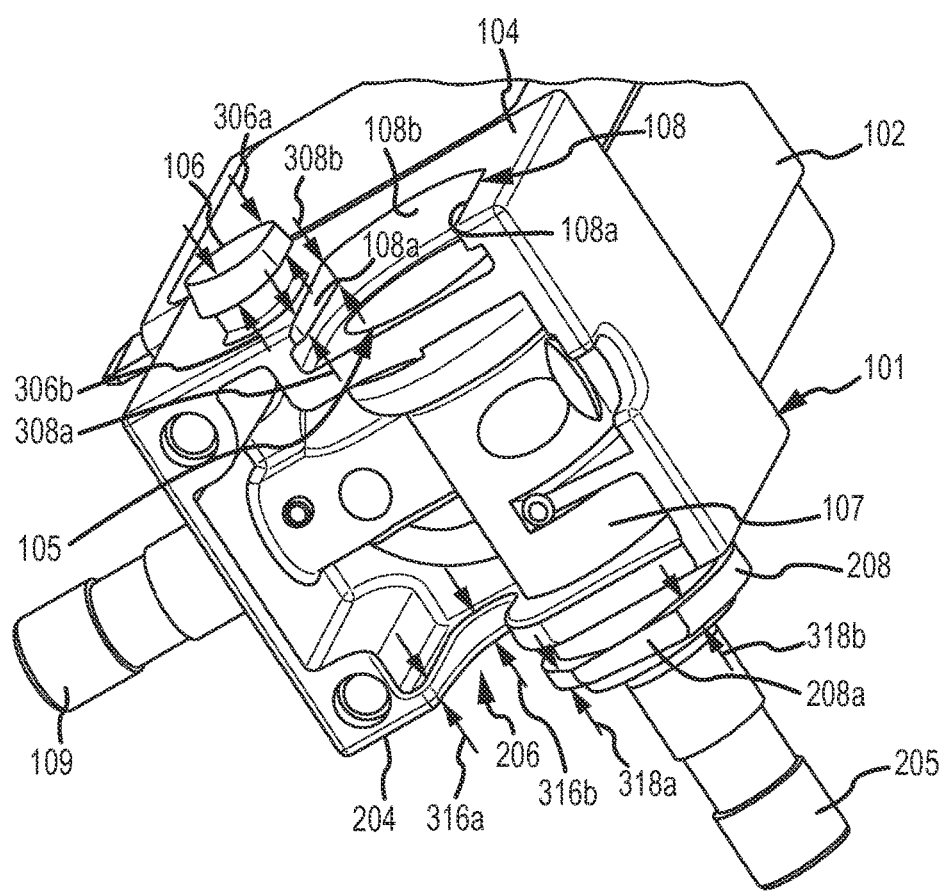
FIG. 3 shows another bottom perspective view of the fluid module according to another embodiment.

FIG. 3 shows a bottom perspective view of the fluid module 100 according to another embodiment. The components of the fluid module 100 shown in FIG. 3 are substantially the same as in the previously shown embodiments. However, in FIG. 3, the ramped surfaces of the coupling parts are visible. The ramped surfaces that are described below can aid in drawing the two fluid modules 100 together as the two fluid modules 100 are rotated with respect to one another. Therefore, rotation of the fluid modules results in a clamping action and a better seal is formed. In the embodiment shown in FIG. 3, each of the coupling parts includes a ramped surface with varying thicknesses. It should be appreciated that not all of the coupling parts need to include the ramped surfaces and in some embodiments only a single coupling part may need the ramped surface while the remaining parts can be substantially flat. In some embodiments, none of the coupling parts include ramped surfaces and an adequate seal is formed by a user manually pressing the fluid stem 205 into the aperture 105 before rotating the two modules to lock them together.

According to the embodiment shown, the coupling tab 106 is shown with a ramped surface that results in a first end having a first thickness 306a and a second end having a second thickness 306b. The second thickness 306b is shown as being greater than the first thickness 306a. As a result of the varying thicknesses of the coupling tab 106, as the coupling tab 106 is received by the slot 206, the increased thickness brings the two fluid modules 100 closer together.

According to an embodiment, the shoulder 108 can also include ramped surfaces. The ramped surface is shown on one of the straight portions 108a of the shoulder 108 in FIG. 3. As can be seen, the straight portion 108a comprises a first thickness 308a and a second thickness 308b. The second thickness 308b is greater than the first thickness 308a. As can be appreciated, the opposite straight portion 108a can include a ramped surface; however, the thicknesses will be reversed. In other words, the second thickness 308b will be at the top of the straight portion 108a near the curved portion 108b while the first thickness 308a will be near the bottom portion of the straight section 108a. This configuration will allow the engagement rim 208 to be brought closer to the aperture 105 substantially evenly as the two fluid modules 100 are rotated relative to one another. As those skilled in the art can appreciate, if only one of the straight portions 108a includes a ramped surface, the modules will be brought together with one side tighter than the other, which could damage the modules 100 or cause a fluid leak. Therefore, if one of the straight portions 108a includes a ramped surface, then it is advantageous if both portions include ramped surfaces.

Referring now to the second coupling side 204, the slot 206 can include a ramped surface with a first thickness 316a at a first end and a second thickness 316b at a second end.

According to an embodiment, the second thickness 316*b* is greater than the first thickness 316*a* such that as the coupling tab 106 is being inserted into the slot, the increasing thickness of the slot 206 draws the first coupling side 104 of the adjoining fluid module 100 closer to the second coupling side 204.

According to another embodiment, the engagement rim 208 can include ramped surfaces. The ramped surfaces results in each of the curved regions 208*b* having a first thickness 318*a* that increases to a second thickness 318*b*. As can be appreciated, the increased thicknesses can draw the fluid stem 205 into the aperture 105 further as the two fluid modules 100 are rotated relative to one another resulting in a tighter fit.

Figure 4:
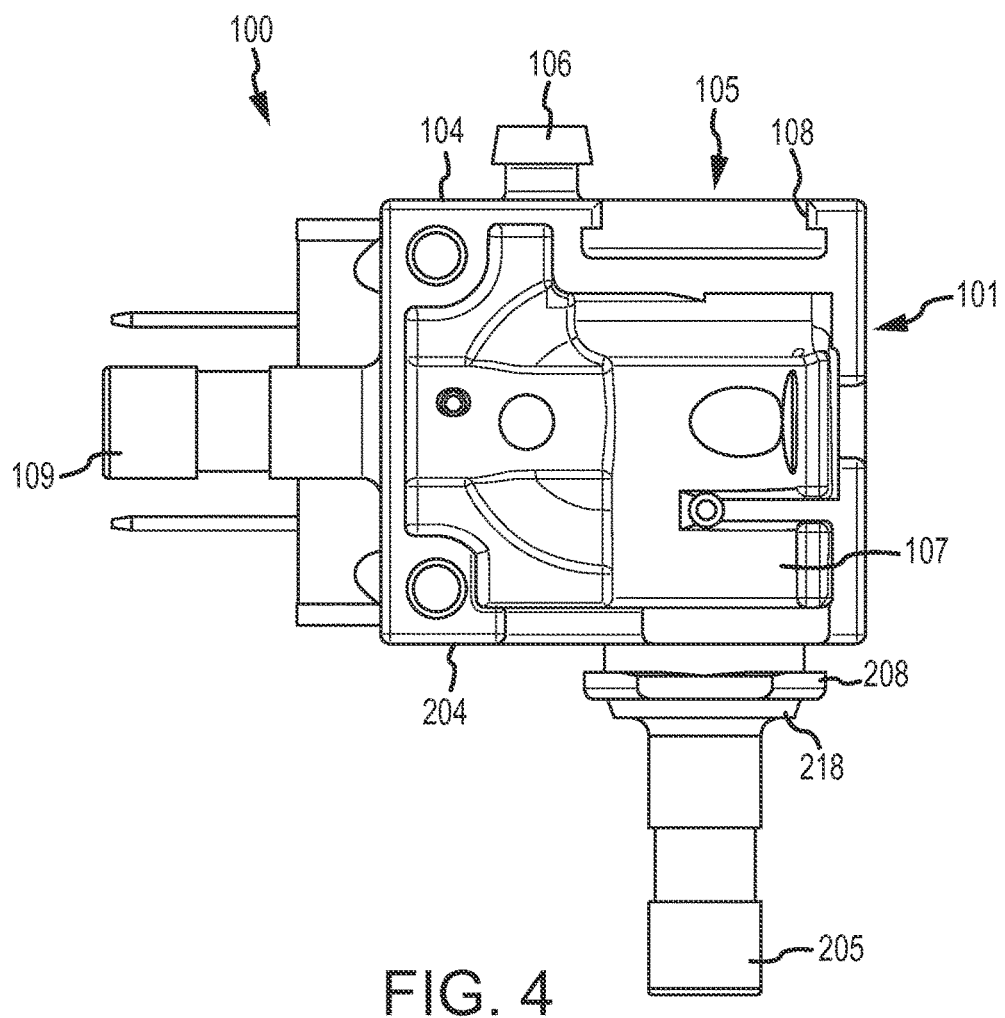
FIG. 4 shows a bottom view of the fluid module according to an embodiment.

FIG. 4 shows a bottom view of a fluid module 100 according to an embodiment. In FIG. 4, it can be seen that the fluid passageway 107 extends from the first coupling side 104 to the second coupling side 204. According to an embodiment, at least a portion of the female coupling part on the first coupling side 104 and at least a portion of the male coupling part on the second coupling side 204 can be in fluid communication with the fluid passageway 107. More specifically, the aperture 105 and the fluid stem 205 can be in fluid communication with the fluid passageway 107. As can be appreciated, the fluid can flow through the fluid module 100 via the fluid passageway 107. Additionally, in embodiments where the fluid module 100 comprises a valve, the fluid outlet 109 can selectively be brought into fluid communication with the fluid passageway 107.

According to the embodiment shown in FIG. 4, the fluid stem 205 comprises a smaller outer diameter than the inner diameter of the fluid passageway 107 between the first and second coupling sides 104, 204. Consequently, once the fluid stem 205 is inserted into the aperture 105 of an adjoining fluid module 100, the fluid can still flow to the fluid outlet port 109 even though the end of the fluid stem 205 may extend beyond the junction where the fluid outlet port 109 splits from the fluid passageway 107.

Figure 5:
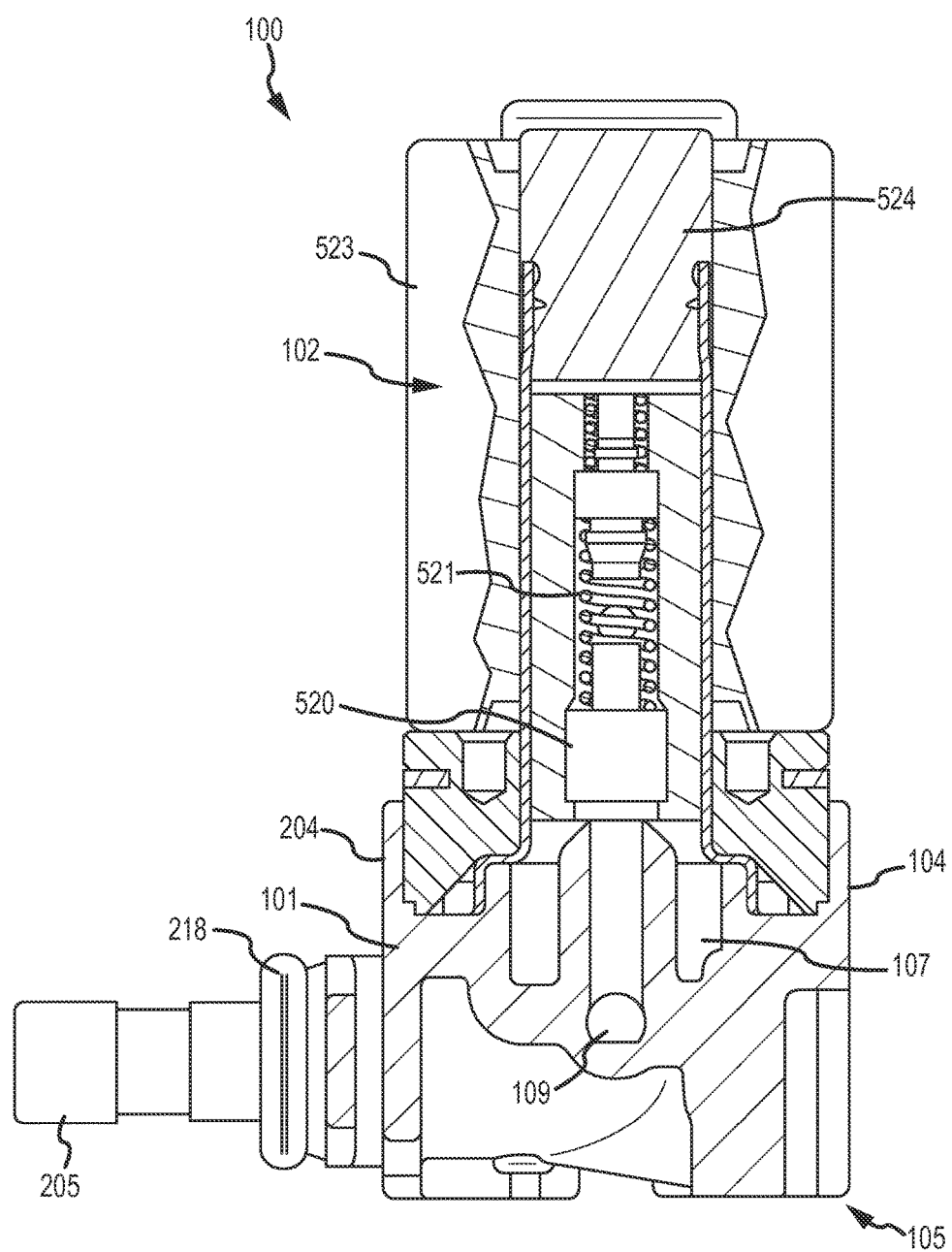
FIG. 5 shows a cross-sectional view of a fluid module according to an embodiment.

FIG. 5 shows a cross-sectional view of the fluid module 100 according to an embodiment. In the embodiment shown in FIG. 5, the fluid module 100 comprises a solenoid valve. According to an embodiment, the electromagnetic portion 102 can be actuated to open a fluid communication path between the fluid passageway 107 and the fluid outlet port 109. According to an embodiment, the fluid communication path can be controlled based on a position of a plunger 520. As is generally known in the art, the plunger 520 can be biased in a first direction via a biasing member 521. The plunger 520 can be biased in a second direction, substantially opposite the first direction upon energizing a solenoid 523. A fixed core 524 can be used to increase the magnetic attraction produced by the solenoid 523. The operation of solenoid valves is generally known in the art and thus, the description of the operation of the valve has been simplified. The important aspect of the valve shown in FIG. 5 is that the valve can be actuated to open a fluid communication path between the fluid passageway 107 and the fluid outlet port 109.

FIG. 6 shows the coupling system being used to couple two adjoining fluid modules 100*a*, 100*b* according to an embodiment. In the embodiment shown, the two fluid modules 100*a*, 100*b* are substantially identical. In FIG. 6, the coupling between the two adjoining fluid modules 100*a*, 100*b* is shown at a beginning stage. As can be appreciated, FIG. 6 shows the system where the female coupling part on the first side 104 of the first fluid module 100*a* has received a portion of the male coupling part on the second side 204 of the second fluid module 100*b*. Consequently, the fluid stem 205 of the second fluid module 100*b* is no longer visible. The fluid stem 205 of the second fluid module 100*b* has been received by the aperture 105 and the fluid passageway 107. Furthermore, in the position shown in FIG. 6, the engagement rim 208 of the second fluid module 100*b* is positioned within the shoulder 108 of the first fluid module 100*a*. However, the curved regions 208*b* of the engagement rim 208 are not yet engaged with the straight portions 108*a* of the shoulder 108.

According to an embodiment, in order to fully engage the two fluid modules 100*a*, 100*b*, the fluid modules need to be rotated with respect to one another. In the embodiment shown, the second fluid module 100*b* can be rotated in the direction of the arrow 660 with respect to the first fluid module 100*a*. In the embodiment shown, the fluid module 100*b* can be rotated approximately 90°; however, in other embodiments, the degree of rotation may be different. According to an embodiment, as the second fluid module 100*b* rotates approximately 90°, the coupling tab 106 of the first fluid module 100*a* engages the slot 206 of the second fluid module 100*b*. As mentioned above, the engagement may comprise a snap-fit engagement that subsequently requires a threshold force to be applied in order to disengage the coupling tab 106 from the slot 206. Furthermore, the engagement of the slot 206 with the coupling tab 106 can prevent the fluid module 100*b* from rotating further than approximately 90°.

Substantially simultaneously, the curved regions 208*b* of the engagement rim 208 of the second fluid module 100*b* engage the straight portions 108*a* of the shoulder 108 of the first fluid module 100*a*. As discussed above, if one or more of the coupling parts include ramped surfaces, as the second fluid module 100*b* is rotated, the two fluid modules 100*a*, 100*b* are also brought closer together thereby clamping the sealing member 218 to provide a substantially fluid-tight seal.

As can be appreciated, additional fluid modules may be provided that are coupled in series with the second fluid module 100*b* in a similar manner as the second fluid module 100*b* was coupled to the first fluid module 100*a*. However, after the last fluid module 100 in the series is coupled, an end cap 600 is required to retain the fluid pressure within the system.

According to an embodiment, the end cap 600 can include a plug 601, a sealing member 618, and an end cap engagement rim 608. The end cap engagement rim 608 can be substantially similar to the engagement rims 208 formed on the fluid modules 100. In some embodiments, the end cap engagement rim 608 can comprise substantially the same dimensions as the engagement rim 208 formed on the fluid modules 100. Therefore, the end cap engagement rim 608 of the end cap 600 can include cutout regions 608*a* that can align with the straight sections 108 of the shoulder 108. Likewise, the end cap engagement rim 608 can include curved portions 608*b*, which can engage with the straight portions 108*a* upon rotating the end cap 600 with respect to the fluid module 100.

Therefore, in order to close off the end of the fluid module 100*b*, the end cap 600 can be inserted into the female coupling part. More specifically, the plug 601 can be inserted into the aperture 105 of the fluid module 100*b*. With the cutout regions 608*a* aligned with the straight portions 108*a* of the shoulder 108, the end cap 600 can be fully inserted. Thereafter, the end cap 600 can be rotated with respect to the fluid module 100 so that the rounded portions 608*b* of the end cap 600 can lock behind the straight portions 108*a* of the fluid module 100.

According to an embodiment, with the end cap 600 engaged with the second fluid module 100*b*, the fluid stem 205 of the first fluid module 100*a* can be coupled to a fluid supply (not shown) and the system can be pressurized. It should be appreciated, that as an alternative, an end cap may be provided that engages the fluid stem 205 and the fluid supply can be coupled to the female coupling part of the last fluid module in the chain.

The embodiments described above provide a unique coupling system for a fluid distribution system. The coupling system advantageously does not require extra components. Rather, the coupling system can be provided as integral components of fluid modules of the fluid distribution system. Further, the coupling system can include male and female coupling components on each coupling side of the fluid modules. Therefore, adequate and secure coupling can be ensured. In some embodiments, one or more of the coupling parts can include ramped surfaces that draw the two adjoining fluid modules 100 closer together as the two modules are rotated with respect to one another.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other fluid distribution systems, and not just to the embodiments described above and shown in the accompanying figures. Accordingly, the scope of the embodiments described above should be determined from the following claims.

I claim:

1. A coupling system for a fluid module (100) of an expandable fluid distribution system, comprising:
   a first coupling side (104) of the fluid module (100) including:
      a female coupling part comprising an aperture (105) and a shoulder (108);
      a male coupling part comprising a coupling tab (106) extending from the first coupling side (104);
   a second coupling side (204) of the fluid module (100) including:
      a female coupling part comprising a slot (206) sized and shaped to receive at least a portion of the coupling tab (106) of an adjoining fluid module and engage the portion of the coupling tab (106) when the coupling tab is rotated relative to the slot; and
      a male coupling part comprising a fluid stem (205) and an engagement rim (208) sized and shaped to engage the shoulder (108) of an adjoining fluid module.

2. The coupling system of claim 1, further comprising a fluid passageway (107) extending from the first coupling side (104) to the second coupling side (204) and in fluid communication with the aperture (105) and the fluid stem (205).

3. The coupling system of claim 1, wherein the shoulder (108) comprises one or more straight portions (108*a*) and one or more curved portions (108*b*).

4. The coupling system of claim 3, wherein the engagement rim (208) comprises a generally cylindrical shape with one or more cutout regions (208*a*) and one or more curved regions (208*b*).

5. The coupling system of claim 3, wherein the shoulder (108) comprises two straight portions (108*a*), which are separated by a distance ($d_1$) and wherein the curved regions (208*b*) comprise a diameter ($d_2$), which is greater than the distance ($d_1$).

6. The coupling system of claim 5, wherein the engagement rim (208) comprises two cutout regions (208*a*) separated by a distance ($d_3$), which is less than the distance ($d_1$).

7. The coupling system of claim 1, wherein the slot (206) is sized and shaped to receive the coupling tab (106) in a snap-fit arrangement.

8. The coupling system of claim 1, further comprising a sealing member (218) positioned around a portion of the fluid stem (205).

9. The coupling system of claim 1, further comprising an end cap (600) comprising a plug (601) sized and shaped to engage the aperture (105) and an engagement rim (608) sized and shaped to engage the shoulder (108).

10. The coupling system of claim 1, wherein one or more of the shoulder (108), the engagement rim (208), the coupling tab (106), or the slot (206) comprise a ramped surface resulting in a change in thickness.

11. The coupling system of claim 1, wherein the coupling tab is rotated relative to the slot by approximately 90 degrees.

* * * * *